M. G. HUBBARD.
Mowing Machine.
No. 45,158.
Patented Nov. 22, 1864.
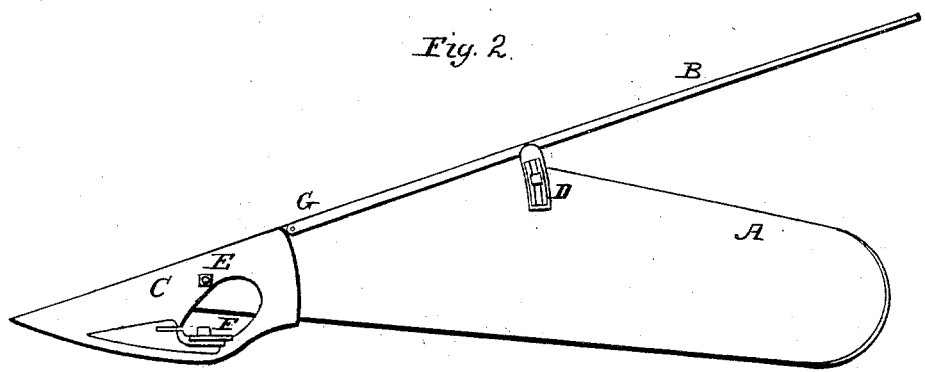
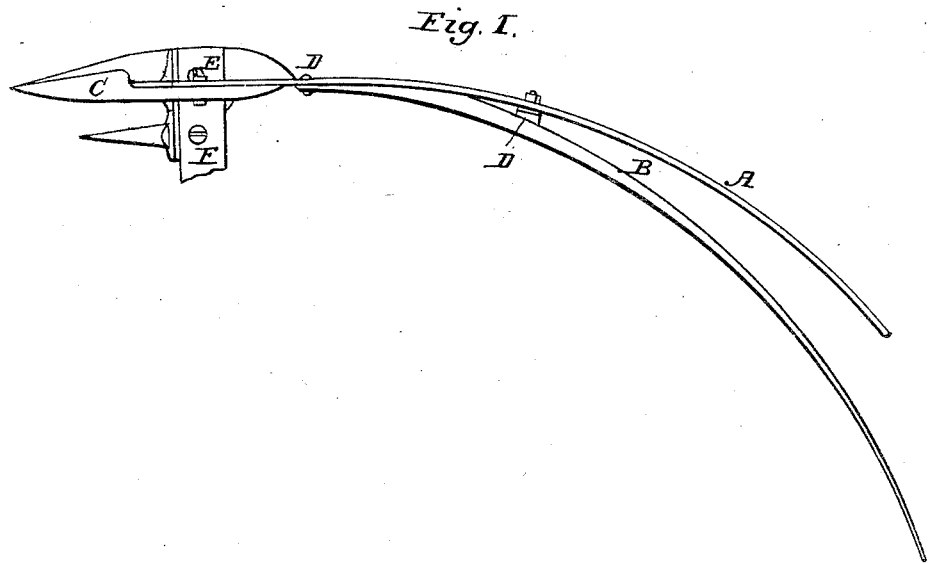

UNITED STATES PATENT OFFICE.

M. G. HUBBARD, OF SYRACUSE, NEW YORK.

IMPROVEMENT IN MOWING-MACHINES.

Specification forming part of Letters Patent No. 45,158, dated November 22, 1864.

*To all whom it may concern:*

Be it known that I, MOSES G. HUBBARD, of the city of Syracuse, in the State of New York, have invented certain new and useful Improvements in Mowing-Machines; and I do hereby declare the following to be a full and clear description thereof, reference being had to the accompanying drawings, in which—

Figure 1 represents a top view of my improvement, and Fig. 2 is a side view thereof.

These improvements relate to and form an improved track board or clearer for mowing-machines, and are the results of all my experience in that branch of mechanical labor.

It is necessary to clear a track at the outer end of the cutting apparatus, so that in cutting the next swath the inner shoe will slide on the ground in order to avoid raising the cutters too high by the shoe, &c., riding over cut grass.

In several kinds of grass I have experienced great difficulty in clearing a sufficiently perfect track for the inner shoe, because in my early experience I used the ordinary straight track-clearer hinged to the rear end of the outer shoe, and in order to clear a track sufficiently wide I had to make the clearer of an inconvenient length or else set it at so great an angle as to cause it in many cases to operate imperfectly, and in my experiments I have not until now attained a curved track-clearer and its attachments that could be adjusted to different kinds of grass and work perfectly in all.

I found that by making my track-clearer in the form of a curve instead of placing it at an angle its operation was much more perfect, and that I could clear a much wider track thereby, and by pivoting at G a curved grass-wing, B, to my improved curved track-clearer *a* and making this grass-wing adjustable vertically by the adjusting-iron D, I attain a combination which is capable of being so adjusted as to effectually part and clear a track in all kinds of grass, as the "grass-wing" can be depressed for low tangled grass and clover, or it can be elevated for tall grass. I hinge or pivot this combined curved track-clearer and grass-wing at E to the outer shoe at a point directly over the outer end of the finger-bar F, so that the front end of the track-clearer *a* projects a considerable distance front of the pivot E and forms such a long and strong bearing and support as to steady and strengthen the track-clearer laterally, while at the same time it prevents too great vertical motion, but permits a sufficient amount of such motion to allow the track-clearer to conform to the surface of uneven ground. This point of attachment is of great importance and forms one of the principal elements of my improved arrangement. I locate this hinge or pivot E as high on the vertical flange of the outer shoe, C, as practicable in order to cause the friction of the track-clearer on the ground to counteract in some degree the pressure of the grass on the top of the clearer. I have found that the grass in ordinary track-clearers presses the clearer so hard to the ground as very soon to wear it out; but if this track board or clearer is pivoted at a point as high above its lower edge as possible it will bear much less heavily on the ground and wear out proportionally less.

I usually make this track-clearer of white ash about one inch thick and steamed and bent into a curved form, as seen in Fig. 1; and I usually form the grass-wing of the same material and steamed and bent in a curved form, as shown in Fig. 1. This grass-wing I make about one and one-half inch diameter at its front end and about one inch diameter at its rear end.

In order to constitute my invention, it is necessary to use an outer shoe having a vertical plate extending from its front to its rear end, in order that the clearer-board may be hinged thereto at a point directly over the finger-bar and extend forward along said plate for lateral support, while the rear end of the clearer-board and grass-wing extend back and around toward the machine or away from the cut grass in curved lines, such as substantially described and shown.

Having thus fully described my improvement in track-clearers, what I claim as new therein, and desire to secure by Letters Patent, is—

The combination of a curved track-clearer, hinged as and at the point described, and extending forward as and for the purposes set forth, in combination with a curved adjustable grass-wing attached in the manner described to the upper edge of the clearer-board, substantially as and for the purposes specified.

M. G. HUBBARD.

Witnesses:
  A. A. CARPENTER,
  C. J. LYSTER.